United States Patent [19]

Edwards et al.

[11] Patent Number: 4,570,212
[45] Date of Patent: Feb. 11, 1986

[54] SILICON CONTROLLED RECTIFIER POLYPHASE BRIDGE INVERTER COMMUTATED WITH GATE-TURN-OFF THYRISTOR

[75] Inventors: Dean B. Edwards, Pasadena; Wally E. Rippel, Altadena, both of Calif.

[73] Assignee: California Institute of Technology, Pasadena, Calif.

[21] Appl. No.: 447,483

[22] Filed: Dec. 7, 1982

[51] Int. Cl.$^4$ ............... H02M 7/515; H02H 7/122
[52] U.S. Cl. ............................ 363/138; 363/58; 361/100
[58] Field of Search .......... 363/57, 58, 135–138; 361/56, 57, 88, 91, 100, 111; 307/252 C, 252 M, 252 P, 252 Q

[56] References Cited

U.S. PATENT DOCUMENTS

| | | | |
|---|---|---|---|
| 3,588,667 | 6/1971 | Duff et al. ........................... | 321/5 |
| 3,916,287 | 10/1975 | Brenneisen et al. ............. | 361/100 X |
| 4,214,196 | 7/1980 | Boyce ................................ | 363/138 X |
| 4,231,083 | 10/1982 | Matsuda et al. .................. | 363/135 |
| 4,319,318 | 3/1982 | Rippel ................................ | 363/138 |

FOREIGN PATENT DOCUMENTS

| | | | |
|---|---|---|---|
| 1613774 | 1/1979 | Fed. Rep. of Germany ...... | 363/138 |
| 45-39773 | 12/1970 | Japan ................................ | 365/135 |
| 54-99933 | 8/1979 | Japan ................................ | 363/58 |
| 57-31378 | 2/1982 | Japan ................................ | 363/138 |
| 197708 | 8/1977 | U.S.S.R. ............................ | 363/136 |

OTHER PUBLICATIONS

German Publication "Electrische Bahnen, 77, (1979), H. 11, by Bohm & Kruger, pp. 306–312.
Meiden Review (Eng. Ed.) Japan Ser. No. 61, No. 1, (1981).
SCR Manual, Fifth Ed., General Electric (1977).

Primary Examiner—Peter S. Wong
Attorney, Agent, or Firm—Freilich, Hornbaker, Rosen & Fernandez

[57] ABSTRACT

A polyphase SCR inverter (10) having N switching poles, each comprised of two SCR switches (1A, 1B; 2A, 2B ... NA, NB) and two diodes (D1B; D1B; D2A, D2B ... DNA, DNB) in series opposition with saturable reactors (L1A, L1B; L2A, L2B ... LNA, LNB) connecting the junctions between the SCR switches and diodes to an output terminal (1, 2 ... 3) is commutated with only one GTO thyristor (16) connected between the common negative terminal of a dc source and a tap of a series inductor (14) connected to the positive terminal of the dc source. A clamp winding (22) and diode (24) are provided, as is a snubber (18) which may have its capacitance (c) sized for maximum load current divided into a plurality of capacitors ($C_1, C_2 ... C_N$), each in series with an SCR switch ($S_1, S_2 ... S_N$). The total capacitance may be selected by activating selected switches as a function of load current. A resistor 28 and SCR switch 26 shunt reverse current when the load acts as a generator, such as a motor while braking.

19 Claims, 5 Drawing Figures

SILICON CONTROLLED RECTIFIER POLYPHASE BRIDGE INVERTER COMMUTATED WITH GATE-TURN-OFF THYRISTOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a silicon controlled rectifier (SCR) bridge inverter, and more particularly to a circuit topology which requires only a single gate turn-off (GTO) thyristor to commutate all SCR switches in a polyphase bridge inverter.

Commutator circuits for polyphase SCR bridge inverters are generally complex, because of the need to provide separate commutation for each switching pole. The recent development of gate turn-off (GTO) thyristors with high current and voltage ratings (up to 800 A, 2500 volts, with even higher ratings possible) has made feasible a polyphase SCR bridge inverter suitable for power levels above 1 kW using one and only one GTO thyristor to commutate all SCR switches. Absence of conventional commutation circuitry reduces cost, size, weight and power losses compared to the present state of the art. That is important for extensive commercial applications of a polyphase SCR bridge inverter, such as in converting solar dc power into ac power.

SUMMARY OF THE INVENTION

In accordance with the invention, an N-phase SCR inverter has N switching poles connected between positive and negative terminals of a dc source with a tapped series inductor connected between the positive, or negative, terminal and each switching pole. Each switching pole is comprised of two SCR switches in opposite branches of a bridge and two diodes in opposition to the SCR switches to complete the bridge such that one SCR switch having its anode connected to a common positive node is in series with a diode having its anode connected to the negative node, and the other SCR switch having its cathode connected to the negative node is in series with a diode having its cathode connected to the positive node, where one of the nodes is connected directly to one terminal of the source, and the other is connected to the other terminal through the series inductor. An output terminal from each switching pole is connected to each of the junctions between its SCR switches and their diodes in opposition by separate saturating reactors which isolate those junctions from the output terminal. A GTO thyristor is connected between the tap of the series inductor and the common negative, or positive, terminal. A snubber is connected in parallel with the GTO thyristor, either at the tap of the inductor or at the junction between the inductor and the N switching poles.

The snubber is comprised of a capacitor sized such that, at maximum load current, voltage slew rates across both the GTO thyristor and the SCR switches are maintained to less than their critical values. When the GTO thyristor is turned off the capacitor charges. When the GTO thyristor is turned on, the capacitor discharges through a resistor, thus preparing for the next cycle. To minimize dissipation of power through the discharge resistance, the sized capacitor is divided into a plurality of parallel capacitors, each with its own switch to control its snubbing operation, and each with its own discharge resistor. The various switches may then be turned on selectively in different combinations to size the total capacitance in proportion to the inverter load current, thereby reducing power dissipation under light loads.

When the inverter load acts as a generator, such as a motor while braking, the regenerative power is fed directly into the dc voltage source if it is bidirectional, such as a battery. If it is unidirectional, that regenerative power is diverted through an external load resistance connected in parallel with the inverter by a switch. By controlling the duty cycle of this switch, the average current through this external load resistance is controlled. This control may be made a function of the input dc bus voltage.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
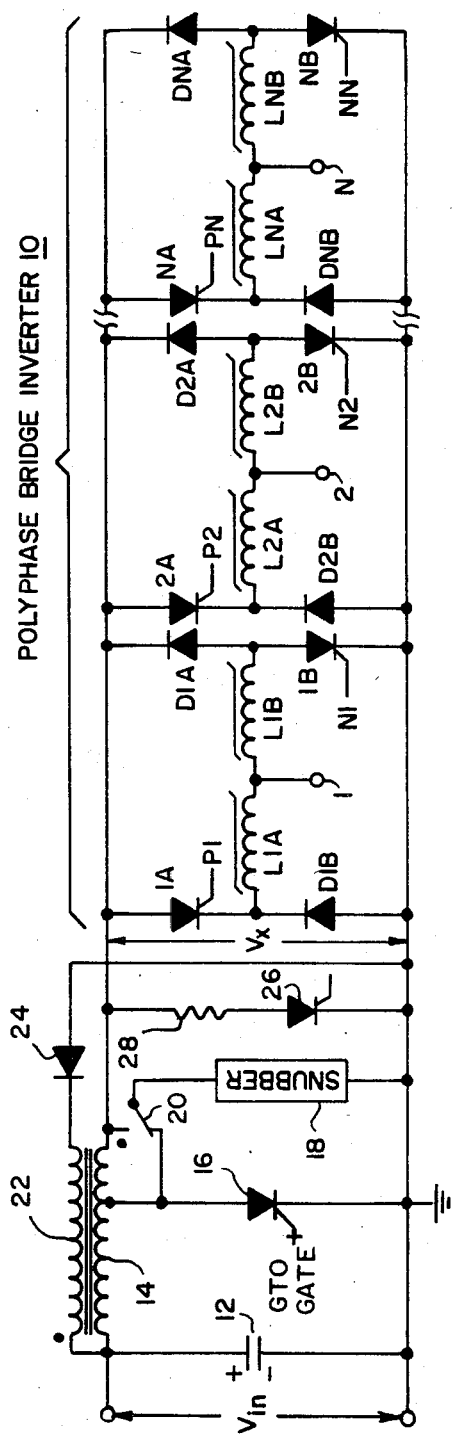
FIG. 1 is a circuit diagram of a polyphase SCR bridge inverter utilizing a GTO thyristor in accordance with the present invention.

Referring now to FIG. 1, a polyphase bridge inverter 10 is shown connected to a dc power source in parallel with a filter capacitor 12 by a tapped inductor 14. The polyphase bridge inverter utilizes pairs of SCR switches 1A, 1B; 2A, 2B; . . . NA, NB in separate switching poles to alternately connect the positive and negative terminals of the dc power source to respective output terminals 1, 2 . . . N in a phase relationship controlled by the times that SCR switches are turned on and off. Saturating reactors L1a, L1B; . . . LNA, LNB isolate each of the paired SCR switches 1A, 1B; . . . NA, NB from its respective antiparallel diode D1A, D1B; D2A, D2B; . . . DNA, DNB while the SCR switches are being commutated.

The SCR switches 1A, 2A . . . NA are selectively turned on by respective positive gate drive signals P1, P2 . . . PN, and turned off by a GTO thyristor 16 being turned on in response to commutation timing signals (CTS) while the gate drive signals P1, P2 . . . PN are removed (or made negative) from SCR switches to be turned off thus controlling the periods during which the terminals 1, 2 . . . N are connected to the positive terminal of the dc source through the inductor 14. Similarly the SCR switches 1B, 2B . . . NB are turned on by respective positive gate drive signals N1, N2 . . . NN to control the periods during which the terminals 1, 2 ... N are connected directly to the negative terminal of the dc source, and turned off by the GTO thyristor 16.

The GTO thyristor 16 is switched on by a positive gate drive pulse to the gate at the appropriate time to commutate SCR switches, and then turned off by a negative gate drive pulse. While the GTO thyristor is conducting, every SCR switch having its gate drive signal removed (or made negative) is turned off. While current through all SCR switches is thus interrupted, each SCR switch having its gate drive signal maintained will resume conduction when the GTO thyristor is turned off.

While the GTO thyristor 16 is turned on, the tap of the inductor 14 is pulled to near ground. The autotransformer action of the tapped inductor causes the node common to the inductor and switching poles to drop below ground, i.e., to go negative. This in turn causes each of the SCR switches to be reverse biased. Consider, for example, the SCR switch 1A of the first switching pole. Its anode is driven negative via diode D1B with respect to its cathode by the direct application of the negative voltage generated by the autotransformer action of the inductor 14. The other SCR switch of the first pole, namely SCR switch 1B, has its anode driven negative with respect to its cathode through diode D1A.

The saturating reactors L1A, and L1B isolate the SCR switches 1A and 1B from their antiparallel diodes D1A and D1B during this time. Without these reactors, back bias of the SCR switch 1B would be limited to the forward drop of its antiparallel diode D1B, and unlimited currents would flow through the diodes D1A and D1B during the commutation interval, i.e., during the positive gate drive pulse to the GTO thyristor 16. These saturating inductors L1A and L1B are small since they need support only the volt-seconds associated with the commutation, i.e., the time integral of voltage $V_x$ during conduction of the GTO thyristor. The duration of that commutation interval is chosen to be sufficient to span the turn-off time of the SCR switches. After that period, the GTO thyristor is turned off by the application of a suitable negative gate drive pulse.

Figure 3A:
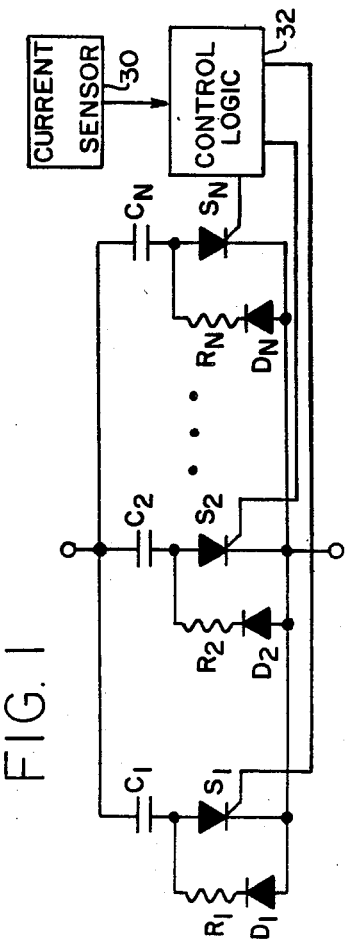
FIGS. 3a and 3b are circuit diagrams of two alternate arrangements of an improved snubber in which capacitance is maintained proportionate to the load.
Figure 2:
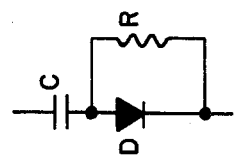
FIG. 2 is a circuit diagram of a snubber for control of the rate of rise of the off-state voltage (anode to cathode) of the commutation GTO thyristor and SCR switches in FIG. 1.
Figure 3B:
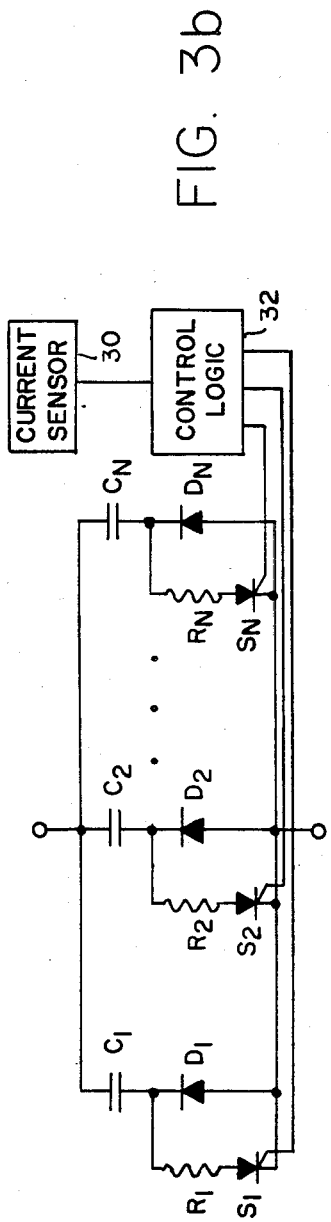

Upon the GTO thyristor 16 being turned off, care must be taken to assure that the forward rate of rise in voltage (dv/dt) applied to the SCR switches, and the GTO thyristor itself, does not exceed their respective critical values. This is because a high rate of rise may cause an SCR switch, or the GTO thyristor, to revert to the on state. Since the rate of rise which a commercial device can withstand is known, the commutation circuit may be designed to limit the maximum dv/dt that may be reached. This is customarily done with a snubber 18 connected either to the tap of the inductor 14 or the junction between the inductor and the SCR bridge circuits. A switch 20 is shown to indicate the choice. In practice, that switch would not be included once the choice is made. A conventional snubber is shown in FIG. 2, and improved snubbers are shown in FIGS. 3a and 3b.

Before describing the improved snubbers in detail, the operation of the multiphase inverter will be described in greater detail. First it should be noted that although the individual SCR switches may be turned on at any point in time, it is preferable to turn the selected ones on only while the GTO thyristor is turned on to minimize SCR turn-on losses, and thus conserve energy and reduce SCR stresses. While the GTO thyristor is turned on, selected SCR switches are turned off by removing gate drive to those SCR switches, or by driving their gates negative.

Figure 4:
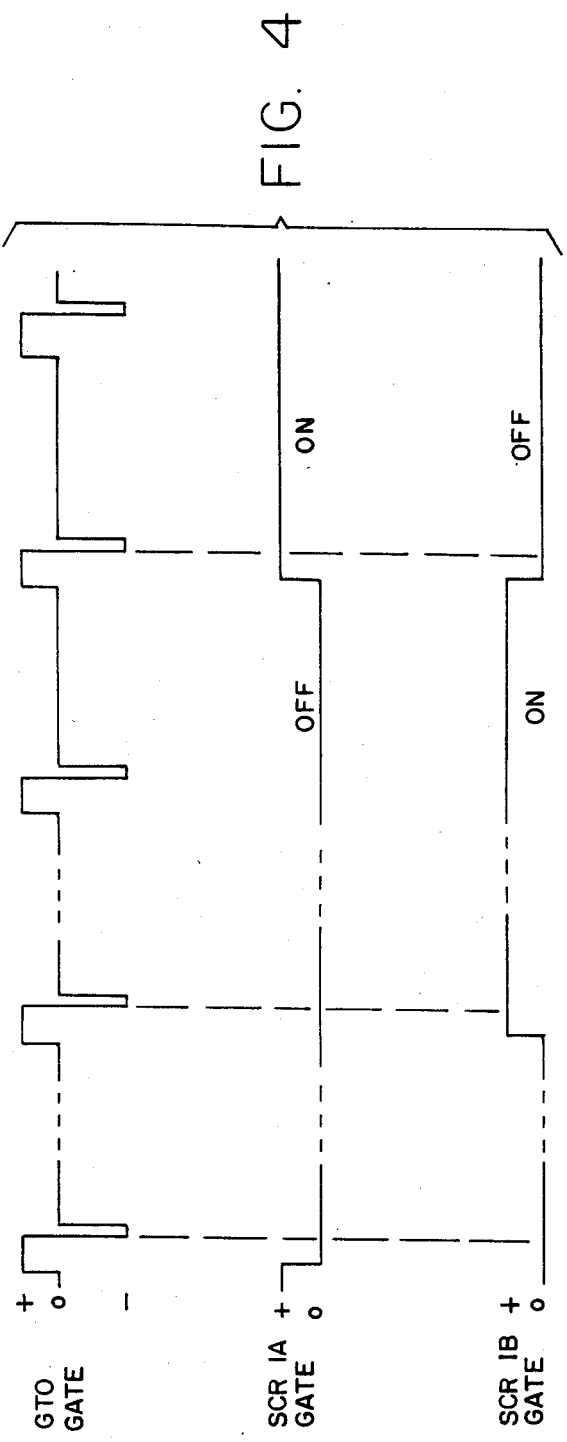
FIG. 4 is a timing diagram useful in understanding the operation of the circuit of FIG. 1.

Considering only the first inverter pole in the waveform diagram of FIG. 4, and assuming the SCR switch 1A is initially on, a GTO gate pulse turns the GTO thyristor on so that the voltage at the tap of the inductor 14 drops to near zero. During the positive GTO gate pulse, the gate drive of the SCR switch 1A is removed (or made negative). Current through that SCR switch 1A is thus cut off. The GTO thyristor is turned off by a negative GTO gate pulse. Current through the saturating reactor L1A is maintained through the diode D1B during this time interval and provides a conduction path for reactive currents. If the SCR switch 1B receives a positive gate drive during a subsequent commutation cycle, it is turned on as soon as the GTO thyristor is turned off. This condition may persist through one or more subsequent GTO turn-on periods until gate drive signals are applied to the gates of the individual SCR switches to reverse their states during a commutation cycle, i.e., a GTO turn-on period, which may occur during different commutation cycles, as just described, or during the same commutation cycle, as shown in FIG. 4. The diode D1A conducts during an interval directly following the turn-off of the SCR switch 1B and provides a conduction path for reactive currents.

It is apparent that during the interval between active commutation cycles for the first switching pole, selected ones of the remaining inverter switching poles may be commutated for polyphase inversion. It is also apparent that since the SCR switches are separately controlled, many different conventional turn-on and turn-off control algorithms may be applied to the polyphase inverter of FIG. 1, such as a six-step inversion for an inverter having three switching poles. For some algorithms, the GTO thyristor is turned on at regular intervals, and commutation of any one or more SCR switches may be performed during any GTO turn-on interval. The frequency of these intervals may be varied in accordance with load voltage and current to minimize system losses. For other algorithms, the GTO thyristor may be turned on at irregular intervals as needed to commutate selected SCR switches.

One possible algorithm provides that whenever current in a given phase exceeds a threshold e.g., a reference sinewave, gate drive to the conducting SCR switch of that phase is removed, and commutation of that SCR switch automatically occurs during the next regular commutation interval. And when current in a given phase drops below a second lower reference sinewave, the appropriate SCR switch is turned on. To minimize switching losses, the turning on of the SCR switch may be controlled to occur during the next GTO turn-on interval. Other more complex algorithms will occur to those skilled in the art for particular applications.

The particular algorithm selected is not important to the present invention. What is important is the use of only one GTO thyristor to commutate all 2N SCR switches in an N-phase SCR bridge inverter regardless of what algorithm is employed. The topology is amenable to pulse width modulation (PWM) and bidirectional energy flow operation. Obviating the need of any other commutation circuitry reduces cost, weight, size, and power losses as compared to prior art bridge commutators. Control circuitry is simplified since only one of two SCR switches per phase and one GTO thyristor need be driven during each commutation interval. Since suitably rated SCR switches and GTO thyristors are available, application to high voltage, high power systems is economically feasible, such as at power levels above 1 kW.

A clamp winding 22 negatively coupled to the inductor 14 is connected in series with a diode 24 between the positive terminal and the negative terminal (ground) of the power source to prevent the output of the inductor 14 from swinging to excessively high positive voltages when the GTO thyristor is turned off. The clamp winding returns stored energy to the source when the GTO thyristor is turned off. Leakage inductance between the clamp winding 22 and the inductor 14 should be minimized to minimize spikes in the energy to the load. Depending on the inductance of the inductor 14, the ratio between the turns of the inductor 14 and the clamp winding 22, the peak input currents, and the commutation frequency, the current flow through the combination of the diode 24 and the GTO thyristor 16 will be either continuous or discontinuous. If this current is continuous, a fast recovery clamping diode 24 is required. Where the combination of these currents are guaranteed to be discontinuous, the recovery properties of the clamping diode are less critical. The input capacitor 12 is expected to by-pass ac components of input currents, so its capacitance must be sufficient.

The inductor 14 must have sufficient inductance between the tap and the positive terminal of the power source to limit current increase during the on time of the GTO thyristor 16, and the core must not saturate under peak load currents. The inductor size may be increased beyond the above minimum to the point where currents into the inverter section are essentially constant over an entire cycle of operation, thus enabling current-fed operation. Leakage inductance between the windings on opposite sides of the tap must be minimized to achieve optimum efficiency.

When the load is a motor, it is desirable that it provide negative torque to handle overhauling loads, i.e., to provide dynamic braking. Where the power source is a battery, or other bidirectional source, the motor acting as a generator will supply power to the source. However, where the power source is unidirectional, such as where power is derived from a bridge rectifier or solar cells, it is necessary to divert the reverse current resulting from dynamic braking. That is accomplished by an SCR switch 26 and resistor 28. The SCR switch 26 is turned on to connect the resistor 28 as an external load when needed for dynamic braking. This SCR switch is commutated in the same manner as the SCR switches in the bridge inverter. By alternately turning the switch on and commutating it off, and controlling the duty cycle of the SCR switch, the average current through the resistor may be controlled to equal the reverse current generated by the braking motor.

Referring now to the conventional snubber shown in FIG. 2, the capacitor C is sized such that, at maximum peak current, dv/dt is less than a critical value. The power dissipated, $P_R$, in the resistor R is given by the equation:

$$P_R = \tfrac{1}{2} C V^2 f$$

where V is the voltage to which C charges while snubbing, i.e., when the GTO switch is turned off, and f is the commutating frequency. The capacitor discharges through the resistor during the next GTO turn-on interval to prepare for the next snubbing operation when the GTO thyristor is turned off. The foregoing shows that the power dissipation under light loads is equal to that at full load. It would be desirable to reduce this power dissipation under light loads. That is accomplished with the improved snubber shown in FIG. 3a.

The improved snubber shown in FIG. 3a is comprised of a plurality of snubbers in parallel. Each snubber is conventional except that the diode in series with the capacitor is replaced by an SCR switch, and a diode is connected in series with the discharge resistor. When a given SCR switch is not turned on, the associated capacitor is not allowed to charge and discharge so that power dissipation through the associated resistor is zero. Only those capacitors $C_1, C_2 \ldots C_N$ associated with SCR switches $S_1, S_2 \ldots S_N$ that are turned on will charge when the GTO thyristor is turned off to control the dv/dt across the GTO thyristor. The charged capacitor will then discharge through the diode and resistor. In that manner the total capacitance of the snubber, and therefore the total dissipation through the discharge path, can be controlled according to the needs of the polyphase bridge inverter during any commutation cycle. If desired, the capacitors and resistors may be sized in a binary fashion such that $C_{j+1} = 2C_j$ and $R_{j+1} = \tfrac{1}{2} R_j$ for j between 1 and N. In either case, only as many capacitors are used at a time as necessary so that the power dissipated through discharge resistors $R_1$ through $R_N$ and diodes $D_1$ through $D_N$ will be minimized at all times. One technique for controlling the conduction of the SCR switches, $S_1, S_2 \ldots S_N$ is to sense current from the inductor 14 to the polyphase bridge inverter using a sensor 30. Control logic 32 responds to the level of load current thus sensed to select which SCR switches to turn on to match the snubber capacitance to the number of SCR switches to be commutated for each commutation cycle. These snubber SCR switches $S_2, S_2 \ldots S_N$ are commutated along with all other SCR switches of the inverter by the GTO thyristor 16.

Although a particular embodiment of the invention has been disclosed by way of examples, it is evident that variations and equivalents within the scope of the invention will occur to one normally skilled in the art. For example, all voltages and semiconductor device polarities could be reversed, and in the case of the improved snubber, the SCR thyristors and diodes would be interchanged in position as shown in FIG. 3b. An advantage of this reverse polarity version of the improved snubber is that the SCR switches may be smaller since the peak discharge currents through the resistors are less than the peak charging (snubbing) currents. Otherwise operation is strictly analogous; only those capacitors allowed to discharge through a turned-on SCR switch may accept charging currents to snub the inverter SCR switches and GTO thyristor. Consequently, it is intended that the appended claims be interpreted to cover such modifications and equivalents.

What is claimed is:

1. A polyphase SCR inverter having N switching poles connected at common nodes between positive and negative terminals of a dc source, a tapped series inductor connected between one of said common terminals and one common node, each switching pole being comprised of two SCR switches in opposite branches of a bridge and two diodes in opposition to the SCR switches to complete a bridge such that one SCR switch having its anode connected to a positive one of said common nodes is in series with a diode having its anode connected to a negative one of said common nodes, and the other SCR switch having its cathode connected to the negative one of said common nodes is in series with a diode having its cathode connected to the positive one of said common nodes, an output terminal from each switching pole connected by separate saturating reactors to each of the junctions between said SCR switches and their dodes in series opposition, whereby said separate saturating reactors isolate said junctions from said output terminal, and a GTO thyristor connected between the tap of said series inductor and said common negative terminal.

2. A polyphase SCR inverter as defined in claim 1 including a snubber connected in parallel with said GTO thyristor either at the tap of the inductor or the junction between the inductor and said switching poles.

3. A polyphase SCR inverter as defined in claim 2 wherein said snubber is comprised of a plurality of parallel capacitors, each with a separate switch in series for charging, and each with a separate discharge resistor in series with a diode poled for conduction of discharge current in parallel with said switch, whereby said switches may then be selectively turned on in different combinations to size the total capacitance in proportion to the inverter load current thereby reducing power dissipation under light loads.

4. A polyphase SCR inverter as defined in claim 2 wherein said snubber is comprised of a plurality of parallel capacitors, each with a separate diode in series for charging, and each with a separate discharge resistor in series with a separate switch for conduction of discharge current in parallel with said diode, whereby said switches may then be selectively turned on in different combinations to size the total capacitance in proportion to the inverter load current thereby reducing power dissipation under light loads.

5. A polyphase inverter as defined in claim 1 or 2, wherein the inverter load acts as a generator, a shunt switch and series resistor for diverting reverse current while said inverter load provides negative torque.

6. In a polyphase bridge inverter having a plurality of dc-to-ac SCR switching poles connected in parallel at common nodes between positive and negative terminals of a dc source with a tapped series inductor connected in series between one source terminal and one common node, each switching pole being comprised of two SCR switches in opposite branches of a bridge and a diode in each of the two remaining branches in series opposition to the SCR switches such that one SCR switch having its anode connected to the positive one of said common nodes through the tapped inductor is in series with a diode having its anode connected to the negative one of said common nodes and the other SCR switch having its cathode connected to the negative one of said common nodes is in series with a diode having its cathode connected to the positive one of said common nodes, and an output terminal connected to the junction between each SCR switch and its series opposition diode by a separate saturable reactor for isolation of those junctions, an improvement comprised of a GTO thyristor connected between the tap of said series inductor and the other terminal of said source for commutation of said SCR switches, means for selectively turning said GTO thyristor on and off in response to positive and negative gate drive pulses, respectively, and means for controlling the rate of rise in the output voltage of said tapped inductor when said GTO thyristor is turned off, whereby all SCR switches in said polyphase bridge inverter are commutated using only said GTO thyristor.

7. An improvement as defined by claim 6 wherein said means for controlling the rate of rise in the output voltage of said tapped inductor when said GTO thyristor is turned off is comprised of a plurality of capacitors, each connected in series with a separate switch selectively turned on to permit the capacitor to assume one state of charge, and in series with a diode to permit the capacitor to assume the other state of charge, and a resistor in series with the one of said switch and said diode that is not conductive while said GTO thyristor is turned off, whereby total capacitance is controlled by the control of said switches during a commutation cycle.

8. An improvement as defined in claim 7 wherein each of said separate switches is an SCR switch turned on by a separately controlled gate drive signal, and turned off by said GTO thyristor during commutation cycles.

9. An improvement as defined in claim 6, 7 or 8, including a clamp winding negatively coupled to said tapped inductor, and a diode in series with said clamp winding, said clamp winding and series diode being connected between said positive and negative terminals of said dc source, and said diode in series with said clamp winding being poled for return of energy to said dc source when said GTO thyristor is turned off after each commutation cycle.

10. An improvement as defined in claim 6, 7, or 8 including a shunt switch and series resistor connected in parallel with said switching poles for conduction of reverse current, thereby shunting reverse current from an external load acting as a generator.

11. An improvement as defined in claim 10 wherein said shunt switch is an SCR switch turned on by a separately controlled gate drive pulse and turned off by said GTO thyristor during commutation cycles.

12. An improvement as defined in claim 11 including a clamp winding negatively coupled to said tapped inductor, and a diode in series with said clamp winding, said clamp winding and series diode being connected between said positive and negative terminals of said dc source, and said diode in series with said clamp winding being poled for return of energy to said dc source when said GTO thyristor is turned off after each commutation cycle.

13. In an inverter having a plurality of SCR switches commutated by a switch having an RC snubber circuit in parallel therewith to assure that the forward rate of rise in voltage applied to the SCR switches is limited when the commutating switch is turned off, an improvement in said RC snubber circuit comprised of a plurality of capacitors connected in parallel by separate switches, and means for separately controlling said snubber switches to turn on selected snubber switches for each commutation cycle as a function load current.

14. An improvement as defined in claim 13 including a separate resistor in parallel with each snubber switch and a separate diode in series with each resistor poled for conduction of capacitor discharge current.

15. An improvement as defined in claim 14 including a separate diode in parallel with each snubber switch, and a separate resistor in series with each snubber switch for conduction of capacitor discharge current.

16. An improvement as defined in claim 14 or 15 wherein said snubber switches are SCR switches commutated by said commutation switch.

17. An improvement as defined in claim 14 or 15 wherein said means is comprised of a load current sensor and control logic responsive to said load current for switching on a selected number of snubber switches to provide total snubber capacitance proportional to load current.

18. An improvement as defined in claim 17 wherein said capacitors are sized in a binary fashion such that each one in sequence is twice the preceding one, and wherein each discharge resistor associated with said capacitors sized in sequence is half the preceding one.

19. An improvement as defined in claim 17 or 18 wherein said snubber switches are SCR switches commutated by said commutation switch.

* * * * *